(12) United States Patent  
Chaturvedi et al.

(10) Patent No.: US 11,750,406 B2
(45) Date of Patent: *Sep. 5, 2023

(54) CERTIFICATE REVOCATION CHECK PROXY SERVICE

(71) Applicant: Snowflake Inc., Bozeman, MT (US)

(72) Inventors: Harsh Chaturvedi, Livermore, CA (US); Harsha S. Kapre, San Mateo, CA (US); Srinath Shankar, Belmont, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,922

(22) Filed: Aug. 31, 2022

(65) Prior Publication Data

US 2023/0138608 A1 May 4, 2023

Related U.S. Application Data

(63) Continuation of application No. 17/515,489, filed on Oct. 31, 2021, now Pat. No. 11,516,022.

(51) Int. Cl.
*H04L 9/32* (2006.01)
*H04L 67/1097* (2022.01)
*H04L 67/289* (2022.01)

(52) U.S. Cl.
CPC ............ *H04L 9/3268* (2013.01); *H04L 9/3297* (2013.01); *H04L 67/289* (2013.01); *H04L 67/1097* (2013.01)

(58) Field of Classification Search
CPC ............................ H04L 9/3268; H04L 9/3297
See application file for complete search history.

(56) References Cited

U.S. PATENT DOCUMENTS

| 9,118,487 | B1* | 8/2015 | Robinson ........... H04L 63/0442 |
| 11,516,022 | B1 | 11/2022 | Chaturvedi et al. |
| 11,516,023 | B1 | 11/2022 | Chaturvedi et al. |

(Continued)

OTHER PUBLICATIONS

" U.S. Appl. No. 17/520,041, Supplemental Notice of Allowability mailed Nov. 4, 2022", 3 pgs.
"U.S. Appl. No. 17/823,928, Non-Final Office Action mailed Nov. 7, 2022", 7 pgs.
"U.S. Appl. No. 17/515,489, Final Office Action mailed Apr. 25, 2022", 17 pgs.

(Continued)

*Primary Examiner* — Nelson S. Giddins
(74) *Attorney, Agent, or Firm* — Schwegman Lundberg & Woessner, P.A.

(57) ABSTRACT

A proxy revocation service provides a reliable service for performing revocation checks. The proxy revocation service queries public certificate authorities for the revocation status of a set of digital certificates and maintains a database of the revocation statuses. The proxy revocation service provides a singular endpoint that is Application Protocol Interface (API) accessible to web clients. Web clients communicate with the proxy revocation service through use of API message to perform revocation checks, rather than communicating with the public certificate authorities using an online certificate status protocol (OCSP). Use of the proxy revocation service provides both a reliable service for performing revocation checks as well as shifts the complexity away from the web clients.

20 Claims, 9 Drawing Sheets

(56) References Cited

U.S. PATENT DOCUMENTS

| | | | |
|---|---|---|---|
| 2008/0133906 | A1 | 6/2008 | Parkinson et al. |
| 2009/0132812 | A1 | 5/2009 | Kobozev et al. |
| 2011/0004763 | A1 | 1/2011 | Sato et al. |
| 2011/0167258 | A1 | 7/2011 | Schibuk |
| 2015/0156194 | A1 | 6/2015 | Modi et al. |
| 2019/0074982 | A1 | 3/2019 | Hughes |
| 2020/0052911 | A1 | 2/2020 | Popoveniuc et al. |
| 2020/0127997 | A1* | 4/2020 | Andrews et al. ..... H04L 67/568 |
| 2020/0162994 | A1 | 5/2020 | Jayawardena et al. |
| 2021/0126799 | A1* | 4/2021 | Ramana et al. ...... H04L 9/3297 |
| 2021/0243178 | A1* | 8/2021 | Leach ............... H04L 63/0823 |

OTHER PUBLICATIONS

"U.S. Appl. No. 17/515,489, Non-Final Office Action mailed Jan. 14, 2022", 15 pgs.

"U.S. Appl. No. 17/515,489, Notice of Allowance mailed Aug. 12, 2022", 7 pgs.

"U.S. Appl. No. 17/515,489, Response filed Apr. 14, 2022 to Non-Final Office Action mailed Jan. 14, 2022", 14 pgs.

"U.S. Appl. No. 17/515,489, Response filed Jul. 25, 2022 to Final Office Action mailed Apr. 24, 2022", 15 pgs.

"U.S. Appl. No. 17/520,041, Final Office Action mailed Jun. 6, 2022", 15 pgs.

"U.S. Appl. No. 17/520,041, Non-Final Office Action mailed Feb. 3, 2022", 13 pgs.

"U.S. Appl. No. 17/520,041, Notice of Allowance mailed Aug. 24, 2022", 8 pgs.

"U.S. Appl. No. 17/520,041, Response filed Aug. 8, 2022 to Final Office Action mailed Jun. 6, 2022", 13 pgs.

"U.S. Appl. No. 17/520,041, Response filed May 3, 2022 to Non-Final Office Action mailed Feb. 3, 2022", 14 pgs.

"U.S. Appl. No. 17/823,928, Notice of Allowance mailed Dec. 7, 2022", 8 pgs.

"U.S. Appl. No. 17/823,928, Response filed Nov. 10, 2022 to Non-Final Office Action mailed Nov. 7, 2022", 8 pgs.

"U.S. Appl. No. 17/515,489, Corrected Notice of Allowability mailed Aug. 23, 2022", 2 pgs.

* cited by examiner

CERTIFICATE REVOCATION CHECK PROXY SERVICE

CROSS-REFERENCE TO RELATED APPLICATION

This application is a Continuation of U.S. Pat. Application Serial No. 17/515,489, filed Oct. 31, 2021, the contents of which are hereby incorporated by reference in their entirety.

TECHNICAL FIELD

Embodiments of the disclosure relate generally to digital certificates for secure internet connections and, more specifically, to a certificate revocation check proxy service.

BACKGROUND

Cryptography is used to provide for secure internet communications. For example, cryptographic protocols such as Transport Layer Security (TLS) and Secure Sockets Layer (SSL) are commonly used to establish secure communications between a web client and web server. These protocols utilize a handshake process during which the web client and web server establish trust and negotiate what cryptographic key should be used to encrypt data communications. During this process, a web server provides the web client with a digital certificate to verify itself to the web client.

In some cases, a digital certificate may become untrustworthy, for example, due to a compromise of the private key used to generate the digital certificate. In this type of situation, the digital certificate may be revoked by its issuer to prevent the digital certificate from being used by a bad actor in a man-in-the-middle attack. Web clients perform a revocation check to verify whether a digital certificate has been revoked.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
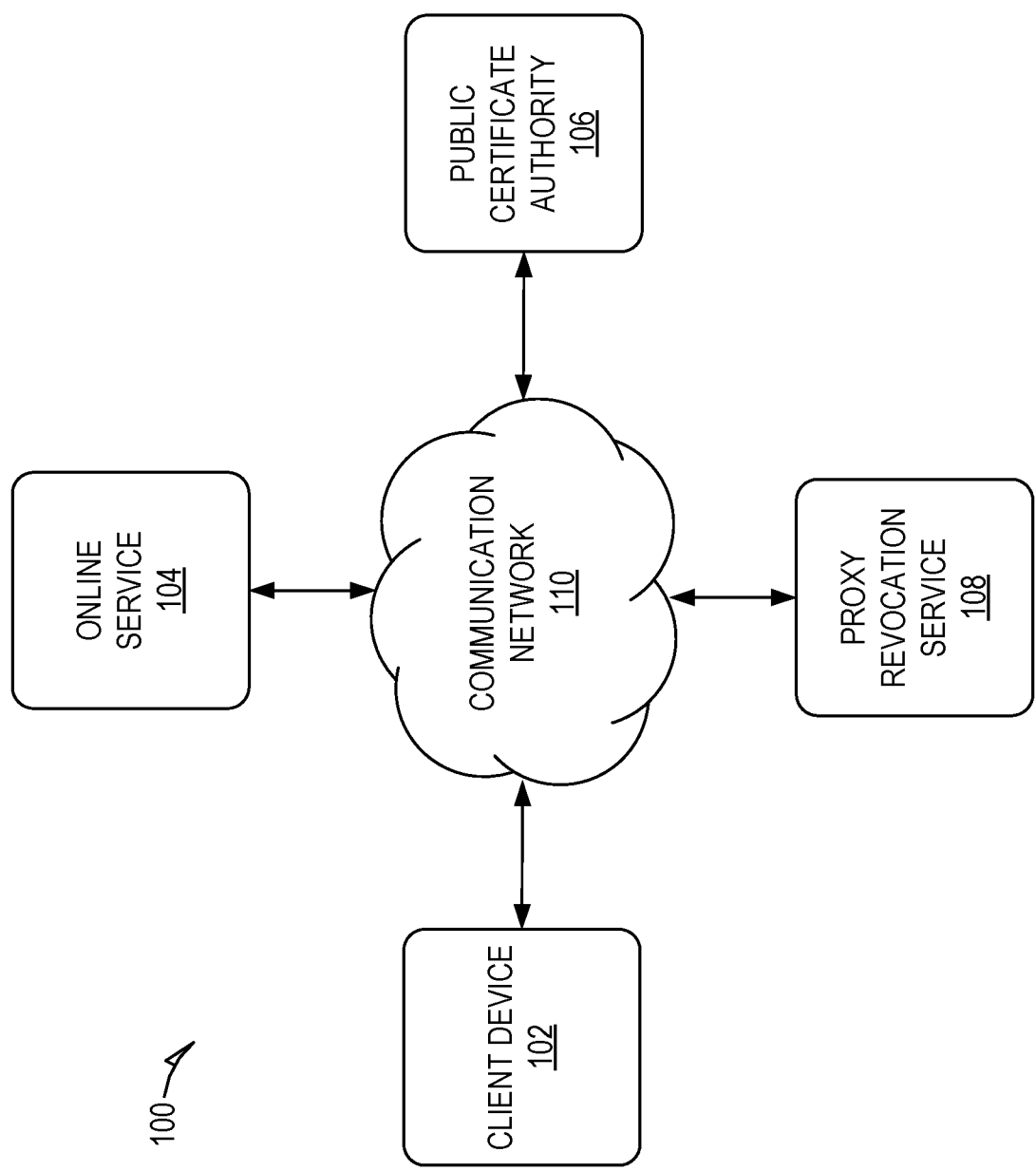
FIG. 1 shows a system including a proxy revocation service for certificate revocation checks, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

As discussed earlier, digital certificates are commonly used when establishing secure communications between a web client and web server. In current implementations, web clients perform revocation checks with public certificate authorities to verify that the digital certificates they receive from a web server are valid (e.g., have not been revoked). This process is problematic as it is dependent on the reliability and performance provided by the public certificate authorities. Downtime and/or latency associated with the public certificate authorities affects the webservices that rely on them to verify digital certificates. Further, this solution places too much complexity at the web client and modifications to the revocation process often require each of the web clients to be updated.

A proxy revocation service alleviates these issues by providing a reliable service for performing revocation checks. The proxy revocation service queries public certificate authorities for the revocation status of a set of digital certificates and maintains a database of the revocation statuses. The proxy revocation service provides a singular endpoint that is Application Protocol Interface (API) accessible to web clients. Web clients communicate with the proxy revocation service through use of API message to perform revocation checks, rather than communicating with the public certificate authorities using an online certificate status protocol (OCSP). Use of the proxy revocation service provides both a reliable service for performing revocation checks as well as shifts the complexity away from the web clients.

The proxy revocation service may also provide for use of multiple sources to determine the revocation status of a digital certificate. The revocation status of a digital certificate may be determined by querying a public certificate authority using either OCSP or by checking a certificate revocation list (CRL) published by the public certificate authority. A CRL provides a list of digital certificates that have been revoked by the public certificate authority. The proxy revocation service may similarly query public certificate authorities for CRLs and maintain a local database of the CRLs. The proxy revocation service can use the stored CRLs to respond to revocation requests in addition to the OCSP revocation status. For example, if the OCSP revocation status for a digital certificate is not available, the proxy revocation service may also check the CRL to determine whether the digital certificate has been revoked.

FIG. 1 shows a system 100 including a proxy revocation service 108 for certificate revocation checks, according to some example embodiments. As shown, multiple devices (i.e., client device 102, online service 104, public certificate authority 106, and proxy revocation service 108) are connected to a communication network 110 and configured to communicate with each other through use of the communication network 110. The communication network 110 is any type of network, including a local area network (LAN), such as an intranet, a wide area network (WAN), such as the internet, a telephone and mobile device network, such as cellular network, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

The online service 104 is one or more computing devices that provide any type of service provided online. For example, the online service 104 may provide a banking service, online marketplace, online database, ride-sharing service, reservation service, retail service, news service and the like. Users communicate with and utilize the functionality of the online service 104 by using a client device 102 connected to the communication network 110 by direct and/or indirect communication.

Although the shown system 100 includes only one client device 102 and online service 104, this is only for ease of explanation and is not meant to be limiting. One skilled in the art would appreciate that the system 100 can include any number of client devices 102 and online services 104. Further, each online service 104 may concurrently accept communications from and initiate communication messages and/or interact with any number of client devices 102 and support connections from a variety of different types of client devices 102, such as desktop computers; mobile computers; mobile communications devices, e.g., mobile phones, smart phones, tablets; smart televisions; set-top boxes; and/or any other network enabled computing devices. Hence, the client device 102 may be of varying type, capabilities, operating systems, and so forth.

The client device 102 interacts with the online service 104 via a client-side application installed on the client device 102 (e.g., web client). In some embodiments, the client-side application includes a component specific to the online service 104. For example, the component may be a stand-alone application, one or more application plug-ins, and/or a browser extension. However, the client device 102 may also interact with the online service 104 via a third-party application, such as a web browser, that resides on the client device 102 and is configured to communicate with the online service 104. In either case, the client-side application may present a user interface (UI) on a display of the client device 102 to provide for interaction with the online service 104. For example, a user may interact with the online service 104 via a client-side application integrated with the file system or via a webpage displayed using a web browser application.

The client device 102 and online service 104 use a cryptographic protocol such as TLS or SSL to establish secure communication with each other. As part of this process, the online service 104 provides the client device 102 with a digital certificate. The client device 102 performs a revocation check to ensure that the digital certificate has not been revoked. In current implementations, client devices 102 communicate directly with a public certificate authority 106 to perform revocation checks. For example, a client device 102 communicates with the public certificate authority 106 using OCSP. This process is problematic because it places a high level of complexity at the client device 102 and public certificate authorities 106 are unreliable.

The proxy revocation service 108 alleviates issues by providing a reliable service for performing revocation checks. The proxy revocation service 108 uses OCSP to query the public certificate authority 106 for the OCSP revocation status of a set of digital certificates and maintains a database of the OCSP revocation statuses. Although the system 100 is shown as including only a single public certificate authority 106, this is just one example and is not meant to be limiting. The system 100 may include any number of public certificate authorities 106 and the proxy revocation service 108 may communicate with any number of public certificate authorities 106 to provide the described functionality.

The proxy revocation service provides a singular endpoint that is API accessible to the client device 102. The client device 102 communicates with the proxy revocation service 108 through use of API messages to perform revocation checks. This contrasts with current implementations in which a client device 102 communicates with a public certificate authority 106 directly using OCSP. Use of the proxy revocation service 108 to facilitate revocation checks provides both increased reliability as well as shifts the complexity away from the client device 102 to the proxy revocation service 108. For example, the client device 102 communicates with the proxy revocation service 108 using simple API requests (e.g., Hypertext Transfer Protocol (HTTP) requests) directed to the proxy revocation service 108, rather than communicating with the public certificate authority using OCSP.

The proxy revocation service 108 may also provide for use of multiple sources to determine the revocation status of a digital certificate. The revocation status of a digital certificate may be determined using either OCSP or by checking a CRL. A CRL provides a list of digital certificates that have been revoked by a public certificate authority. The proxy revocation service 108 queries the public certificate authority 106 for its CRL and maintains a copy of the CRL in a local database. The proxy revocation service 108 can use the stored CRL in addition to the stored OCSP revocation statuses to respond to revocation requests. For example, if the OCSP revocation status for a digital certificate is not available, the proxy revocation service 108 may also check the stored CRL to determine whether the digital certificate has been revoked.

Figure 2:
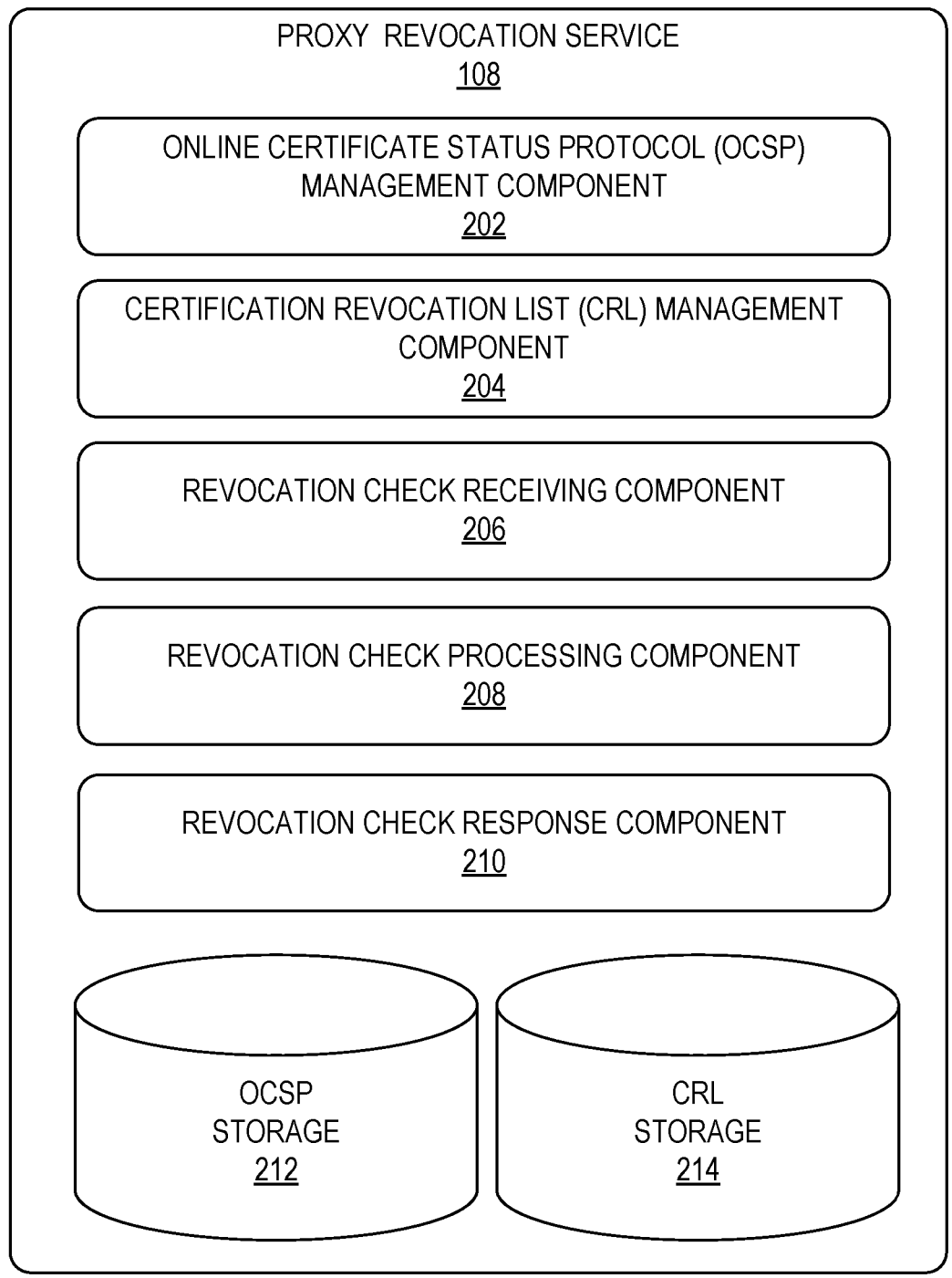
FIG. 2 is a block diagram of a proxy revocation service, according to some example embodiments.

FIG. 2 is a block diagram of a proxy revocation service 108, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the proxy revocation service 108 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the proxy revocation service 108 includes an OCSP management component 202, a CRL management component 204, a revocation check receiving component 206, a revocation check processing component 208, a revocation check response component 210, an OCSP storage 212, and a CRL storage 214.

The OCSP management component 202 facilitates functionality related to maintaining OCSP revocation statuses for a set of digital certificates. An OCSP revocation status is data accessed from a public certificate authority 106 using OCSP that indicates whether a digital certificate has been revoked. OCSP is an internet protocol used for accessing the revocation status of a digital certificate.

The OCSP management component 202 uses OCSP to periodically query public certificate authorities 106 for the OCSP revocation statuses of a set of digital certificates. The set of digital certificates may be associated with any desired set of online services 104. For example, an administrator or other authorized user may define the set of digital certificates. In some embodiments, the set of digital certificates may be associated with accessing a particular online service 104. For example, an online service 104 may incorporate data and/or functionality from other online services 104.

The OCSP management component 202 may be configured to periodically query the public certificate authorities 106 according to any defined schedule. For example, the OCSP management component 202 may be configured to query the public certificate authorities 106 at predefined time intervals, such as every 1 minute, 2 minutes, 3 minutes, and the like.

The OCSP revocation statuses for the set of digital certificates may be maintained in the OCSP storage 212. For example, the OCSP storage 212 may store a unique identifier associated with each digital certificate, data identifying the OCSP revocation status (e.g., revoked, not revoked, unknown) of each digital certificate, and a timestamp value indicating the most recent update to the OCSP revocation status. The OCSP management component 202 updates the OCSP storage 212 based on the OCSP revocation statuses received from the public certificate authorities 106.

The CRL management component 204 facilitates functionality related to maintaining CRL revocation statuses for the set of digital certificates. A CRL is a list that identifies digital certificates that have been revoked by an issuing certificate authority (e.g., public certificate authority 106). A CRL is generated and published by a public certificate authority 106 at set intervals.

The CRL management component 204 periodically queries the public certificate authority 106 for the CRL. The CRL management component 204 may be configured to periodically query the public certificate authorities 106 according to any defined schedule. For example, the CRL management component 204 may be configured to query the public certificate authorities 106 at predefined time intervals, such as every 1 minute, 2 minutes, 3 minutes, and the like. A CRL is generally updated less frequently than the OCSP revocation status for a digital certificate. Accordingly, the CRL management component 204 may be configured to query the public certificate authorities 106 less frequently than the OCSP management component 202 is configured to query the public certificate authorities 106.

The CRLs accessed from the public certificate authorities 106 are stored in the CRL storage 214. For example, each CRL may be stored with data identifying the public certificate authority 106 that published the CRL as well as timestamp values identifying the time at which the CRL was last updated. The CRL management component 204 updates the CRL storage 214 based on the queries to the public certificate authorities 106.

The revocation check receiving component 206 receives revocation check requests from client devices 102. A revocation check request is a request for the revocation status of a digital certificate. The revocation check request includes data identifying the digital certificate (e.g., certificate identifier) and, optionally, the public certification authority 106 that issued the digital certificate.

The revocation check receiving component 206 provides an endpoint that is API accessible. For example, the endpoint may be a Uniform Resource Identifier (URI) to which API requests may be directed. The revocation check requests received by the revocation check receiving component 206 may therefore be API requests, such as HTTP or HTTPS requests. The revocation check receiving component 206 may provide data received in the revocation check requests to the other components of the proxy revocation service 108.

In some embodiments, the revocation check receiving component 206 may be implemented at one or more edge devices. For example, the proxy revocation service 108 may include multiple revocation check receiving components 206 implemented at edge devices to service various geographic regions. In this type of embodiments, the OCSP revocation status and/or CLR revocation status of digital certificates may be cached at the edge device. In this type of embodiment, a revocation check may be processed at the edge device based on the cached OCSP revocation statuses and/or CLR revocation statuses.

The revocation check processing component 208 performs a revocation check based on a received revocation check request received from a client device 102. The revocation check processing component 208 performs the revocation check by querying the OCSP storage 212 for the OCSP revocation status of the digital certificate. For example, the revocation check processing component 208 uses the certificate identifier included in the revocation check request to identify the OCSP revocation status of the digital certificate in the OCSP storage 212.

If the OCSP revocation status for the digital certificate is available in the OCSP storage 212, the revocation check processing component 208 may use the time stamp value associated with the OCSP revocation status to determine whether the OCSP revocation status has expired. For example, the revocation check processing component 208 may use the time stamp to determine whether a predetermined period of time has elapsed after the OCSP revocation status was last updated. The revocation check processing component 208 determines that the OCSP revocation status has expired if the predetermined period of time has elapsed. Conversely, the revocation check processing component 208 determines that the OCSP revocation status has not expired if the predetermined period of time has not elapsed.

If the OCSP revocation status has not expired, the revocation check processing component 208 may use the OCSP revocation status to determine whether the digital certificate has been revoked. For example, the revocation check processing component 208 determines that the digital certificate has been revoked if the OCSP revocation status indicates that the digital certificate status has been revoked and determines that the digital certificate has not been revoked (e.g., is valid) if the OCSP revocation status indicates that the digital certificate status has not been revoked.

Conversely, if the OCSP revocation status is not available (e.g., is unknown or not found in the OCSP storage 212) or has expired, the revocation check processing component 208 may check the CRL revocation status of the digital certificate. For example, the revocation check processing component 208 may query the CRL storage 214 for the CRL accessed from the public certificate authority 106 associated with the digital certificate and determine whether the digital certificate is listed in the CRL as being revoked. The revocation check processing component 208 may also determine whether the CRL revocation status has expired based on the timestamp associated with the CRL stored in the CRL storage 214.

If the CRL revocation status is available and not expired, the revocation check processing component 208 uses the CRL revocation status to determine whether the digital certificate has been revoked. For example, the revocation check processing component 208 determines that the digital certificate has been revoked if the CRL revocation status indicates that the digital certificate status has been revoked (e.g., the digital certificate is listed in the CRL as having been revoked) and determines that the digital certificate has not been revoked (e.g., is valid) if the CRL revocation status indicates that the digital certificate status has not been revoked.

If the CRL revocation status is not available or is expired, the revocation check processing component 208 determines that the revocation status of the digital certificate is unknown. The revocation check processing component 208 provides data identifying the determined revocation status (e.g., revoked, valid, unknown) of the digital certificate to the revocation check response component 210. In turn, the revocation check response component 210 generates a revocation check response that identifies the revocation status of the digital certificate and returns the revocation stats response to the requesting client device 102. The revocation check response may be provided in an easy to parse format, such as a JavaScript Object Notation (JSON) file.

Figure 3:
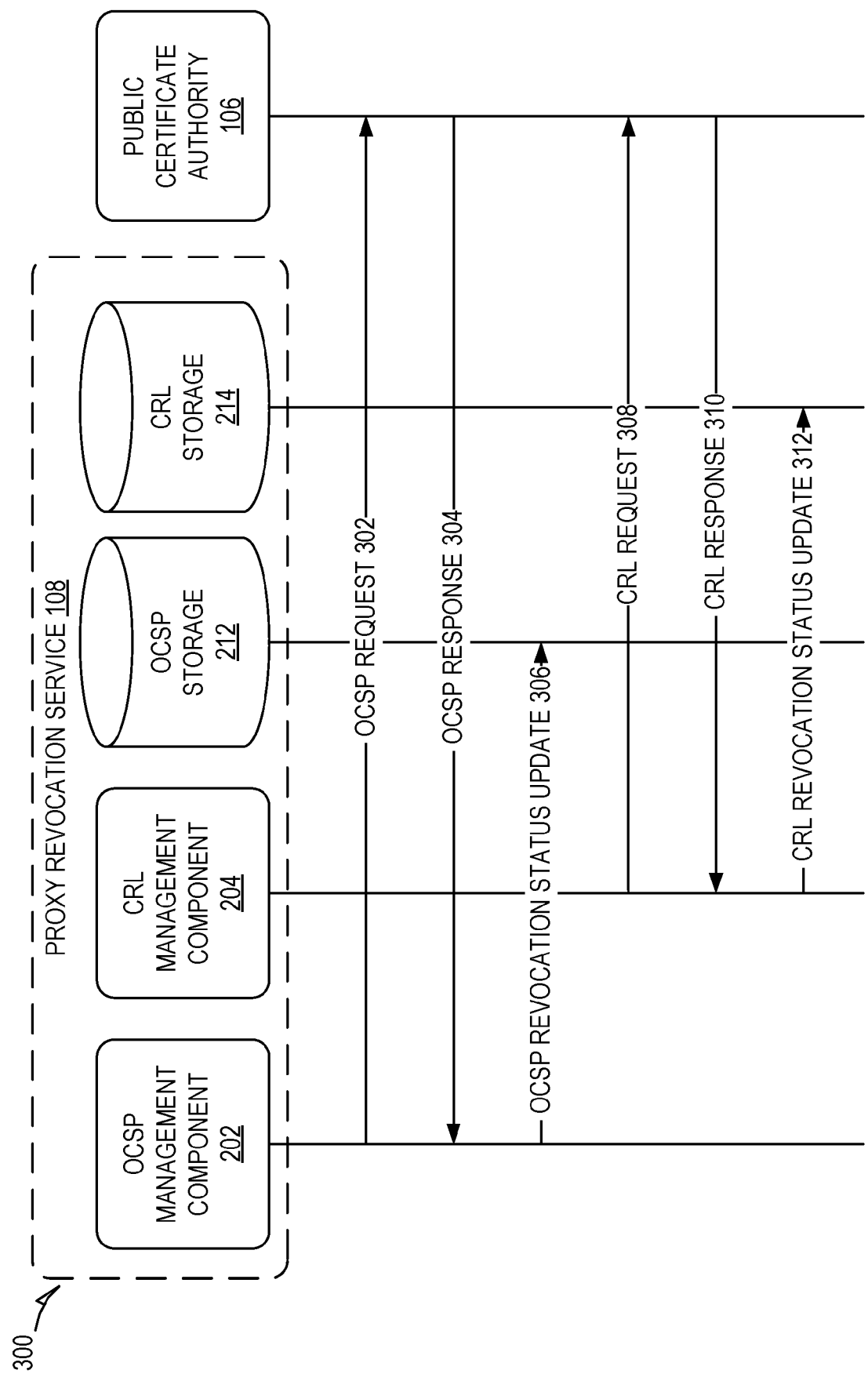
FIG. 3 shows communication within a system for updating revocation statuses at a proxy revocation service, according to some example embodiments.

FIG. 3 shows communication within a system 300 for updating revocation statuses at a proxy revocation service 108, according to some example embodiments. As shown, the OCSP management component 202 transmits an OCSP request 302 to the public certificate authority 106. The OCSP request 302 may be a request for the OCSP revocation status of a digital certificate. The public certificate authority 106 provides an OCSP response 304 that includes the OCSP revocation status of the digital certificate. The OCSP request 302 and OCSP response 304 may both be transmitted according to the OCSP.

The OCSP management component 202 communicates with the OCSP storage 212 to perform an OCSP revocation status update 306 of the digital certificate. This may include updating the OCSP revocation status of the digital certificate in the OCSP storage 212 as well as updating the timestamp value associated with the OCSP revocation status. For example, the time stamp value may be updated to indicate the time at which the OCSP revocation status of the digital certificate was updated in the OCSP storage 212.

As shown, the CRL management component 204 transmits a CRL request 308 to the public certificate authority 106. The CRL request 308 requests the CRL published by the public certificate authority 106. The public certificate authority 106 provides a CRL response 310 that includes the requested CRL. The CRL management component 204 communicates with the CRL storage 214 to perform a CRL revocation status update 312. This may include updating the CRL stored in the CRL storage 214 as well as updating the timestamp value associated with the CRL. For example, the time stamp value may be updated to indicate the time at which the CRL was updated in the CRL storage 214.

Figure 4:
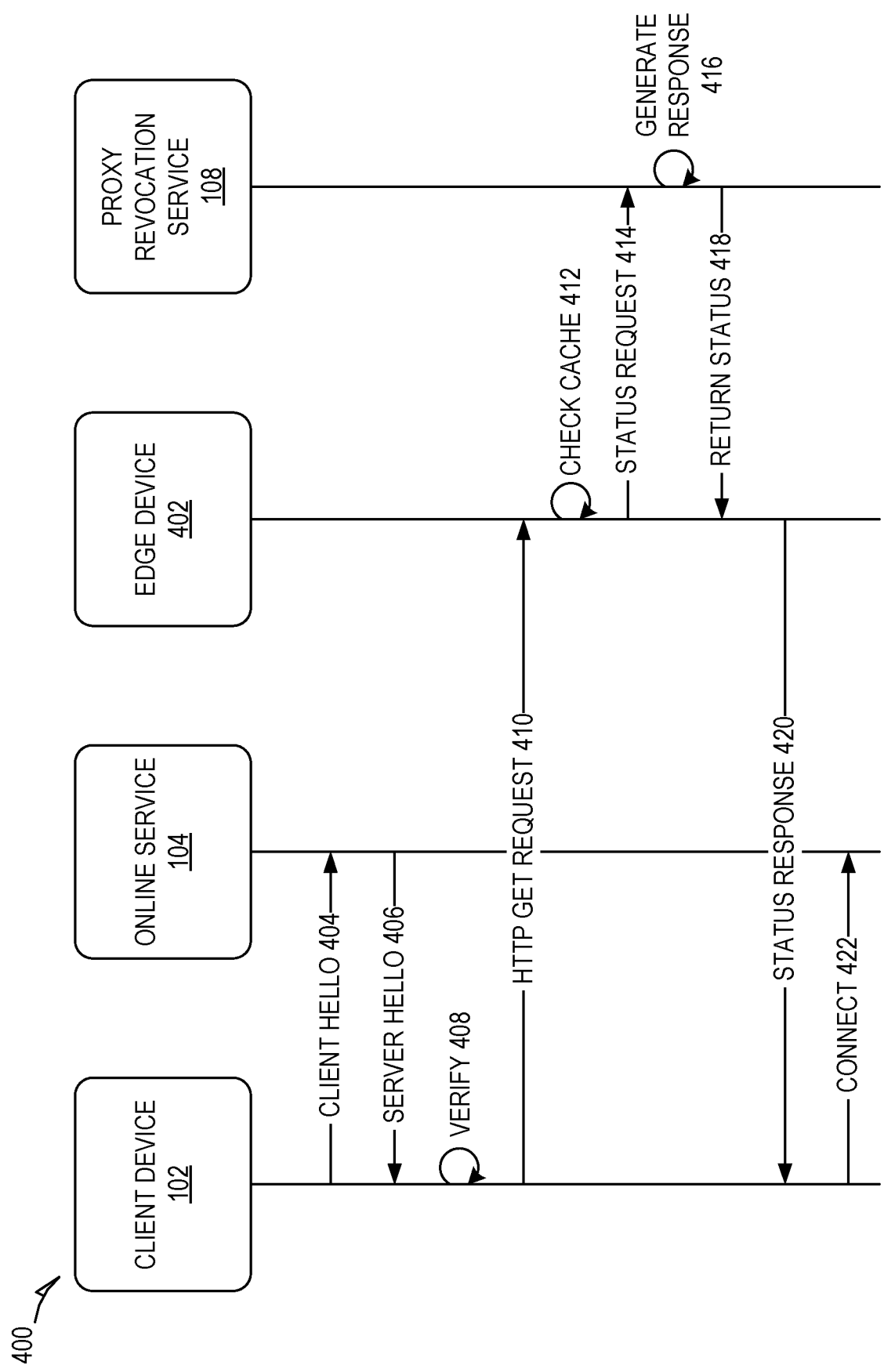
FIG. 4 shows communication within a system for performing a revocation check using a proxy revocation service, according to some example embodiments.

FIG. 4 shows communication within a system 400 for performing a revocation check using a proxy revocation service 108, in accordance with some embodiments of the present disclosure. As shown, a client device 102 transmits a client hello 404 to an online service 104 to initiate secure communications between the client device 102 and the online service 104. The online service 104 returns a server hello 406 that includes a digital certificate. The client device 102 may then attempt to verify 408 the digital certificate. For example, the client device 102 may determine whether the certificate is valid. The client device 102 may also determine whether a valid (e.g., not expired) revocation status for the digital certificate is available in a local cache of the client device 102.

If a revocation status of the digital certificate is not available in a local cache, the client device 102 requests a revocation check from the proxy revocation service 108. As shown, the client device 102 transmits an HTTP get request 410 to an edge device 402. The edge device 402 may be allocated to a geographic region associated with the client device 102. The HTTP get request 410 may be directed to a URI for accessing the proxy revocation service 108. The edge device 402 checks a local cache 412 for a valid revocation status for the digital certificate. For example, the edge device 402 determines whether a revocation status for the digital certificate is stored in the location cache and that the revocation status has not expired. If the valid revocation status for the digital certificate is available in the local cache, the edge device 402 may provide a status response 420 to the client device 102 based on the cached revocation status.

Alternatively, if a valid revocation status for the digital certificate is not available in the local cache, the edge device 402 transmits a status request 414 to the proxy revocation service 108 for the revocation status of the digital certificate. The proxy revocation service 108 generates a response 416 indicating the revocation status of the digital certificate. For example, the revocation status may indicate that the digital certificate is revoked, not revoked, or unknown. The proxy revocation service 108 returns the revocation status 418 to the edge device 402.

The edge device 402 may update its local cache based on the revocation status received from the proxy revocation service 108. The edge device 402 provides the revocation status to the client device 102 in a status response. The client device 102 may update its local cache based on the revocation status received in the status response 420. The client device 102 proceeds based on the revocation status. For example, the client device 102 may disconnect from the online service 104 or connect 422 to the online service 104 based on the revocation status of the digital certificate.

Figure 5:
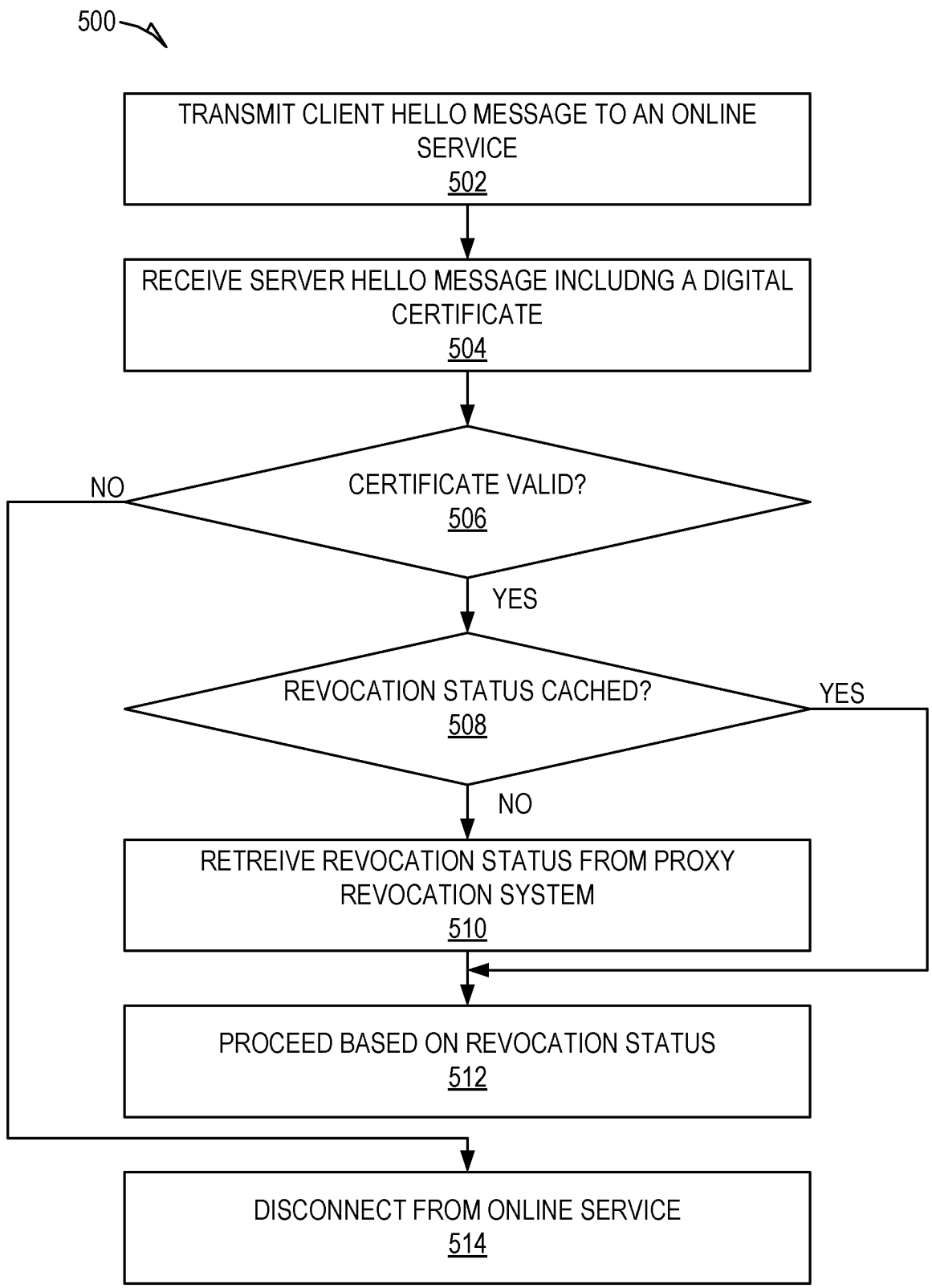
FIG. 5 is a flowchart showing a method for performing a proxy check using a proxy revocation service, according to some example embodiments.

FIG. 5 is a flowchart showing a method 500 for performing a proxy check using a proxy revocation service 108, according to some example embodiments. The method 500 may be embodied in computer readable instructions for execution by one or more processors such that the operations of the method 500 may be performed in part or in whole by a client device 102; accordingly, the method 500 is described below by way of example with reference thereto. However, it shall be appreciated that at least some of the operations of the method 500 may be deployed on various other hardware configurations and the method 500 is not intended to be limited to a client device 102

At operation 502, the client device 102 transmits a client hello message to an online service 104. The client hello message is transmitted as part of the process of establishing secure communications between the client device 102 and the online service 104.

At operation 504, the client device 102 receives a server hello message including a digital certificate. The digital certificate may further include a public key corresponding to a private key maintained by the online service 104 and used to digitally sign the digital certificate.

At operation 506, the client device 102 determines whether the digital certificate is valid. For example, the client device 102 uses the public key to verify that the digital certificate included with the digital certificate. If the client device 102 determines that the digital certificate is not valid, at operation 514 the client device 102 disconnects from the online service 104.

If the client device 102 determines that the digital certificate is valid, at operation 508, the client device 102 determines whether the revocation status of the digital certificate is available in a local cache of the client device 102. This includes determining whether the revocation status is available in the local cache as well as determining whether the revocation status has expired. If the revocation status is available in the local cache and the revocation status is not expired, at operation 512 the client device 102 proceeds based on the revocation status. For example, the client device 102 may connect or disconnect from the online service 104 based on the revocation status.

Alternatively, if the revocation status is not available in the local cache and the revocation status in the local cache is expired, at operation 510 the client device 102 retrieves the revocation status from the proxy revocation service 108. At the operation the client device 102 then proceeds based on the revocation status. For example, the client device 102 may connect or disconnect from the online service 104 based on the revocation status.

Figure 6:
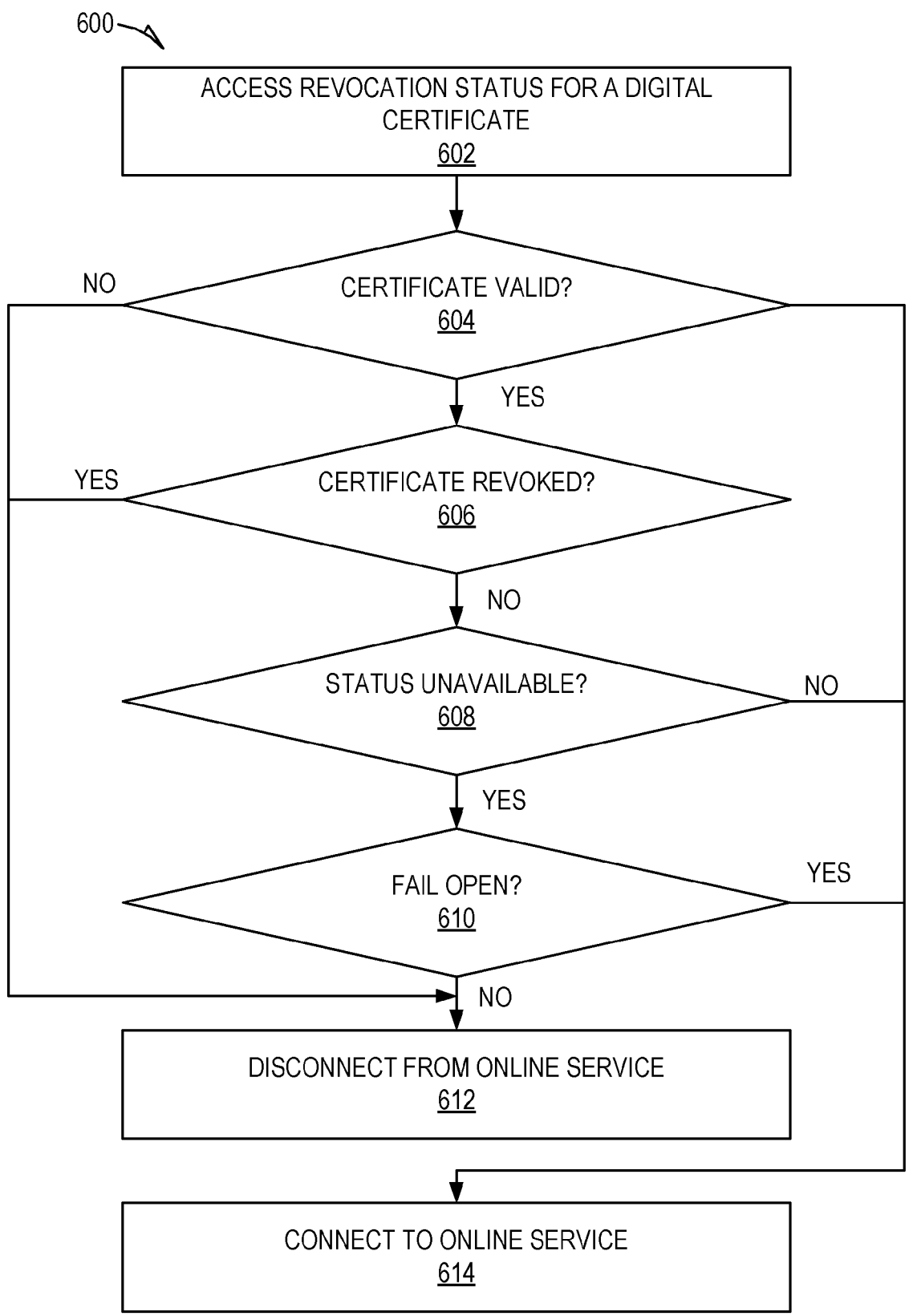
FIG. 6 is a flowchart showing a method for processing a response receiving from a proxy revocation service, according to some example embodiments.

FIG. 6 is a flowchart showing a method 600 for proceeding based on a revocation status, according to some example embodiments. The method 600 may be embodied in computer readable instructions for execution by one or more processors such that the operations of the method 600 may be performed in part or in whole by a client device 102; accordingly, the method 600 is described below by way of example with reference thereto. However, it shall be appreciated that at least some of the operations of the method 600 may be deployed on various other hardware configurations and the method 600 is not intended to be limited to a client device 102.

At operation 602, the client device 102 accesses a revocation status for a digital certificate. This may include accessing the revocation status from a local cache of the client device 102 or receiving the revocation status from the proxy revocation service 108.

At operation 604, the client device 102 determines whether the digital certificate is valid. For example, the client device 102 uses the public key to verify that the digital certificate included with the digital certificate. If the client device 102 determines that the digital certificate is not valid, at operation 514 the client device 102 disconnects from the online service 104.

If the client device 102 determines that the digital certificate is not valid, at operation 612 the client device 102 disconnects from the online service 108.

Alternatively, if the client device 102 determines that the digital certificate is valid, at operation 606, the client device 102 determines whether the digital certification is revoked. If the client device 102 determines that the digital certificate is revoked, at operation 612 the client device 102 disconnects from the online service 108.

Alternatively, if the digital certificate is not revoked, at operation 608 the client device 102 determines if the revocation status is unavailable. If the revocation status not unavailable, meaning that the digital certificate is good (e.g., has not been revoked) at operation 614, the client device 102 connects to the online service 108.

Alternatively, if the revocation status of the digital certificate is unavailable, at operation 610 the client device 102 determines whether the client device 102 has been set to fail open. A client device 102 may be set to fail open to allow for connection with an online service 104 when the revocation status is unknown. An administrator or other authorized user may choose to set or not set the fail open based on their desired preferences. If the client device 102 is set to fail open, at operation 614 the client device 102 connects to the online service 104. Alternatively, if the client device 102 is not set to fail open, at operation 612 the client device 102 disconnects from the online service 104.

Figure 7:
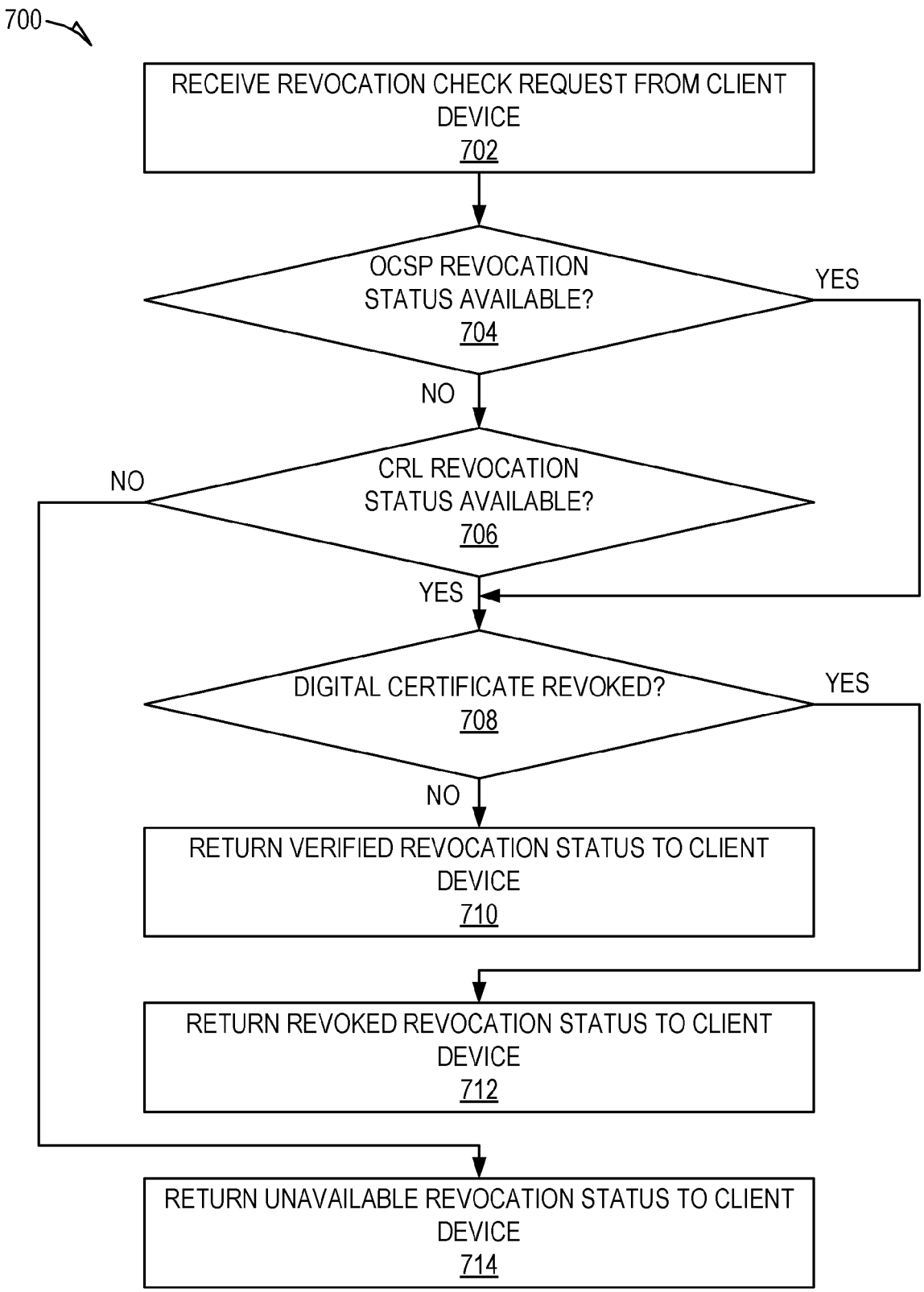
FIG. 7 is a flowchart showing a method for responding to a revocation request using a proxy revocation service, according to some example embodiments.

FIG. 7 is a flowchart showing a method for responding to a revocation request using a proxy revocation service, according to some example embodiments. The method 700 may be embodied in computer readable instructions for execution by one or more processors such that the operations of the method 700 may be performed in part or in whole by a proxy revocation service 108; accordingly, the method 700 is described below by way of example with reference thereto. However, it shall be appreciated that at least some of the operations of the method 700 may be deployed on various other hardware configurations and the method 700 is not intended to be limited to the proxy revocation service 108.

At operation 702, the revocation check receiving component 206 receives a revocation check request from a client device 102. A revocation check request is a request for the revocation status of a digital certificate. The revocation check request includes data identifying the digital certificate (e.g., certificate identifier) and, optionally, the public certification authority 106 that issued the digital certificate.

The revocation check receiving component 206 provides an endpoint that is API accessible. For example, the endpoint may be a URI to which API requests may be directed. The revocation check requests received by the revocation check receiving component 206 may therefore be API requests, such as HTTP or HTTPS requests. The revocation check receiving component 206 may provide data received in the revocation check requests to the other components of the proxy revocation service 108.

At operation 704, the revocation check processing component 208 determines whether an OCSP revocation status for the digital certificate is available. For example, the revocation check processing component 208 queries the OCSP storage 212 for the OCSP revocation status of the digital certificate and determines whether the OCSP revocation status has expired. If the OCSP revocation status is available, at operation 708 the revocation check processing component 208 uses the OCSP revocation status to determine whether the digital certificate has been revoked. If the digital certificate has been revoked, at operation 712 the revocation check response component 210 returns a revoked revocation status to the client device 102. Alternatively, if the digital certificate has not been revoked, at operation 710 the revocation check response component 210 returns a verified revocation status to the client device 102.

If at operation 704 the revocation check processing component 208 determines that the OCSP revocation status of the digital certificate is not available (e.g., the OCSP revocation status is not stored in the OCSP storage 212 or has expired), the operation 706 the revocation check processing component 208 determines whether a CRL revocation status of the digital certificate is available. For example, the revocation check processing component 208 may query the CRL storage 214 for the CRL accessed from the public certificate authority 106 associated with the digital certificate and determine whether the digital certificate is listed in the CRL as being revoked. The revocation check processing component 208 may also determine whether the CRL revocation status has expired based on the timestamp associated with the CRL stored in the CRL storage 214.

If the CRL revocation status is available and not expired, at operation 708 the revocation check processing component 208 uses the CRL revocation status to determine whether the digital certificate has been revoked. If the digital certificate has been revoked, at operation 712 the revocation check response component 210 returns a revoked revocation status to the client device 102. Alternatively, if the digital certificate has not been revoked, at operation 710 the revocation check response component 210 returns a verified revocation status to the client device 102.

If at operation 706 the revocation check processing component 208 determines that the CRL revocation status of the digital certificate is not available (e.g., the CRL is not available in the CRL storage 214 or has expired), at operation 714 the revocation check response component 210 returns an unavailable revocation status to the client device 102.

Figure 8:
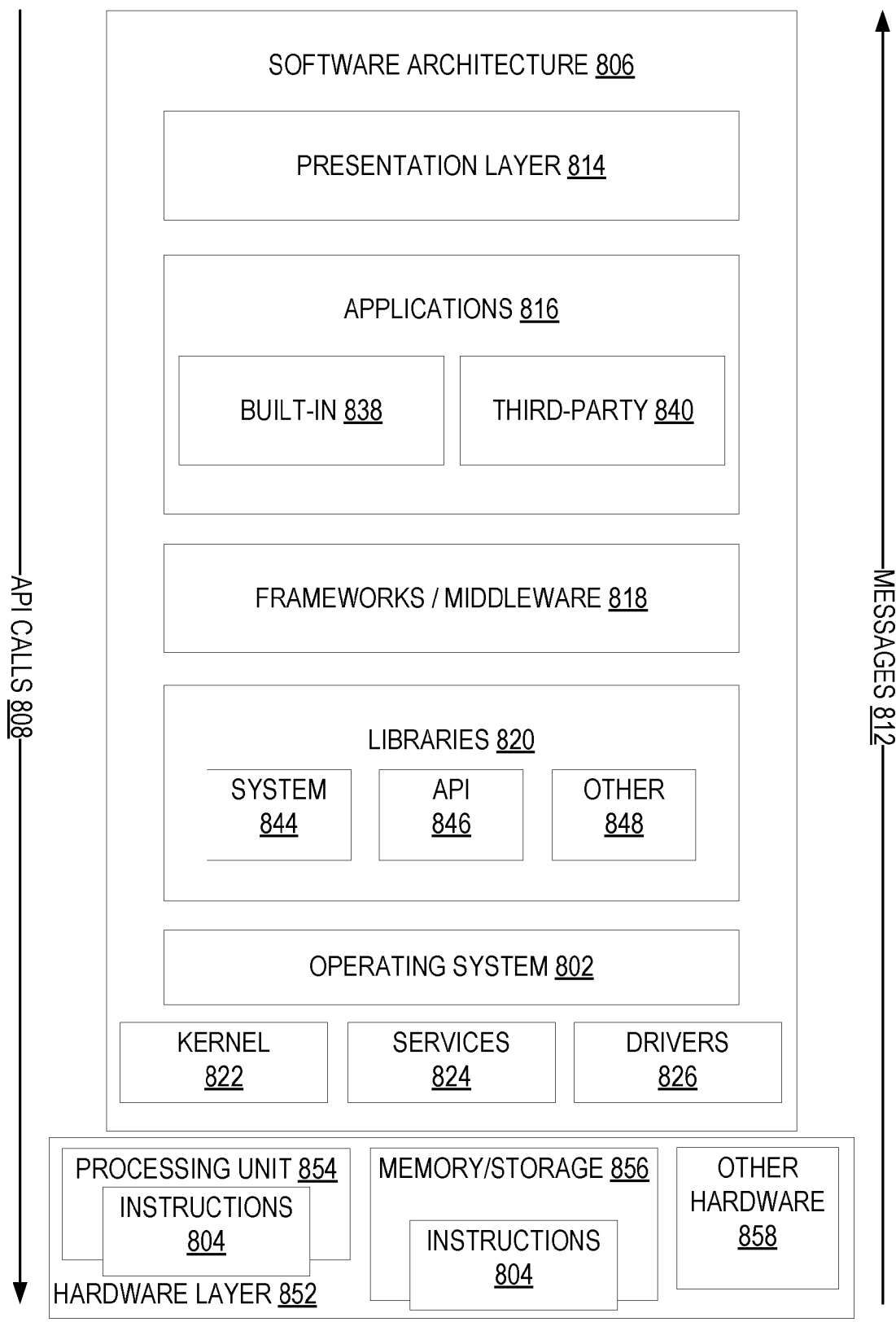
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke application programming interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
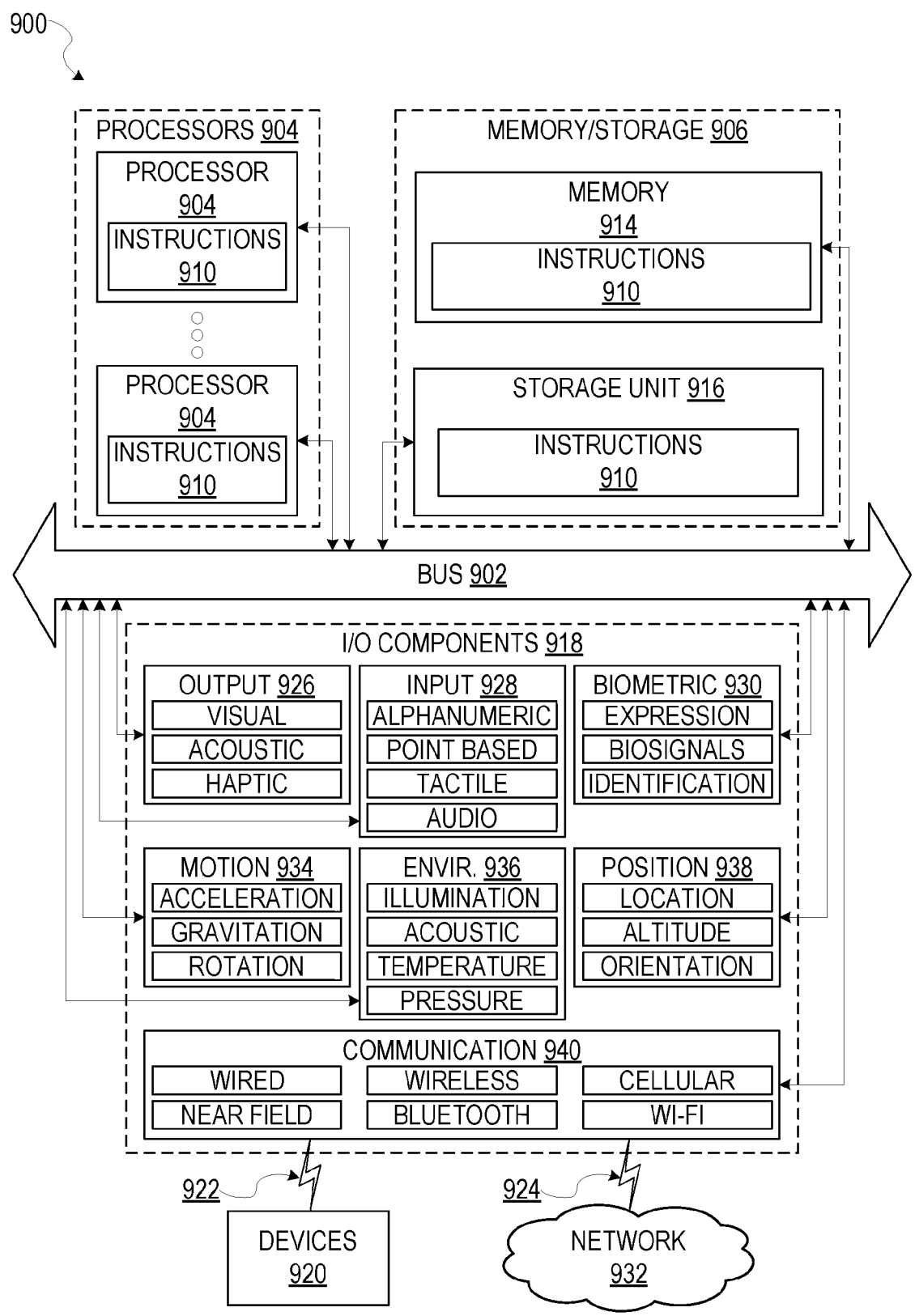
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices 102. A client device 102 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor 904) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 904 may further be a multicore processor having two or more independent processors 904 (sometimes referred to as "cores") that may execute instructions 910 contemporaneously

What is claimed is:
1. A method comprising:
receiving, by a certificate revocation service, a revocation check request from a first client;
querying, by one or more computer processors of the certificate revocation service, a data storage of the certificate revocation service for a revocation status of a first digital certificate; and
responding to the revocation check request based on querying the data storage for the revocation status of the first digital certificate, wherein the first client is configured to disconnect, from a server that provides the first digital certificate to the first client, in response to determining that the first digital certificate is not revoked, the revocation status of the first digital certificate is unavailable, and the first client is not set to fail open.
2. The method of claim 1, further comprising:
populating the data storage using an online certificate status protocol (OCSP) to communicate with a certificate authority, the certificate authority being separate from the certificate revocation service,
wherein the revocation check request is to verify whether the first digital certificate received by the first client has been revoked in response to determining that the revocation status of the first digital certificate is not available in a local cache of the first client.

3. The method of claim 1, further comprising:
receiving, by the certificate revocation service, a second revocation check request from a second client, the second revocation check request being to verify whether a second digital certificate received by the second client has been revoked;
querying the data storage maintained by the certificate revocation service for a revocation status of the second digital certificate; and
responding to the second revocation check request based on querying the data storage for the revocation status of the second digital certificate.

4. The method of claim 1, wherein querying the data storage for the revocation status of the first digital certificate comprises:
determining whether a valid OCSP revocation status for the first digital certificate is available in the data storage.

5. The method of claim 4, wherein responding to the revocation check request based on querying the data storage for the revocation status of the first digital certificate comprises:
in response to determining that the valid OCSP revocation status for the first digital certificate is available in the data storage and that the valid OCSP revocation status indicates that the first digital certificate has not been revoked, transmitting a response to the first client indicating that the first digital certificate has not been revoked.

6. The method of claim 4, wherein determining whether the valid OCSP revocation status for the first digital certificate is available in the data storage comprises:
accessing a timestamp value associated with an OCSP revocation status for the first digital certificate that is stored in the data storage; and
determining, based on the timestamp value, whether the OCSP revocation status for the first digital certificate stored in the data storage has expired.

7. The method of claim 4, further comprising:
in response to determining that the valid OCSP revocation status for the first digital certificate is not available in the data storage, querying a certificate revocation list (CRL) maintained by the certificate revocation service for a CRL revocation status of the first digital certificate, the certificate revocation service having previously accessed the CRL from a certificate authority.

8. The method of claim 7, wherein responding to the revocation check request is further based on querying the CRL for the CRL revocation status of the first digital certificate.

9. The method of claim 8, wherein responding to the revocation check request comprises:
in response to determining that the CRL revocation status of the first digital certificate indicated that the first digital certificate has been revoked, transmitting a response to the first client indicating that the first digital certificate is revoked.

10. The method of claim 8, wherein responding to the revocation check request comprises:
in response to determining that the CRL revocation status of the first digital certificate is not available, transmitting a response to the first client indicating that a revocation status of the first digital certificate is unavailable.

11. A certificate revocation system comprising:
one or more computer processors; and
one or more computer-readable mediums storing instructions that, when executed by the one or more computer processors, cause the certificate revocation system to perform operations comprising:
receiving, by a certificate revocation service, a revocation check request from a first client;
querying, by one or more computer processors of the certificate revocation service, a data storage of the certificate revocation service for a revocation status of a first digital certificate; and
responding to the revocation check request based on querying the data storage for the revocation status of the first digital certificate, wherein the first client is configured to disconnect, from a server that provides the first digital certificate to the first client, in response to determining that the first digital certificate is not revoked, the revocation status of the first digital certificate is unavailable, and the first client is not set to fail open.

12. The certificate revocation system of claim 11, wherein the operations further comprise:
populating the data storage using an online certificate status protocol (OCSP) to communicate with a certificate authority, the certificate authority being separate from the certificate revocation service,
wherein the revocation check request is to verify whether the first digital certificate received by the first client has been revoked in response to determining that the revocation status of the first digital certificate is not available in a local cache of the first client.

13. The certificate revocation system of claim 11, wherein the operations further comprise:
receiving, by the certificate revocation service, a second revocation check request from a second client, the second revocation check request being to verify whether a second digital certificate received by the second client has been revoked;
querying the data storage maintained by the certificate revocation service for a revocation status of the second digital certificate; and
responding to the second revocation check request based on querying the data storage for the revocation status of the second digital certificate.

14. The certificate revocation system of claim 11, wherein querying the data storage for the revocation status of the first digital certificate comprises:
determining whether a valid OCSP revocation status for the first digital certificate is available in the data storage.

15. The certificate revocation system of claim 14, wherein responding to the revocation check request based on querying the data storage for the revocation status of the first digital certificate comprises:
in response to determining that the valid OCSP revocation status for the first digital certificate is available in the data storage and that the valid OCSP revocation status indicates that the first digital certificate has not been revoked, transmitting a response to the first client indicating that the first digital certificate has not been revoked.

16. The certificate revocation system of claim 14, wherein determining whether the valid OCSP revocation status for the first digital certificate is available in the data storage comprises:
accessing a timestamp value associated with an OCSP revocation status for the first digital certificate that is stored in the data storage; and
determining, based on the timestamp value, whether the OCSP revocation status for the first digital certificate stored in the data storage has expired.

17. The certificate revocation system of claim 14, further comprising:

in response to determining that the valid OCSP revocation status for the first digital certificate is not available in the data storage, querying a certificate revocation list (CRL) maintained by the certificate revocation service for a CRL revocation status of the first digital certificate, the certificate revocation service having previously accessed the CRL from a certificate authority.

18. The certificate revocation system of claim 17, wherein responding to the revocation check request is further based on querying the CRL for the CRL revocation status of the first digital certificate.

19. The certificate revocation system of claim 18, wherein responding to the revocation check request comprises:
in response to determining that the CRL revocation status of the first digital certificate is not available, transmitting a response to the first client indicating that a revocation status of the first digital certificate is unavailable.

20. A non-transitory computer-readable medium storing instructions that, when executed by one or more computer processors of a certificate revocation service, cause the certificate revocation service to perform operations comprising:
receiving, by a certificate revocation service, a revocation check request from a first client;
querying, by one or more computer processors of the certificate revocation service, a data storage of the certificate revocation service for a revocation status of a first digital certificate; and
responding to the revocation check request based on querying the data storage for the revocation status of the first digital certificate, wherein the first client is configured to disconnect, from a server that provides the first digital certificate to the first client, in response to determining that the first digital certificate is not revoked, the revocation status of the first digital certificate is unavailable, and the first client is not set to fail open.

* * * * *